US012097721B2

(12) United States Patent
Mehringer

(10) Patent No.: US 12,097,721 B2
(45) Date of Patent: Sep. 24, 2024

(54) TRIFOLD ORGANIZER

(71) Applicant: Nicole Mehringer, Long Beach, CA (US)

(72) Inventor: Nicole Mehringer, Long Beach, CA (US)

(*) Notice: Subject to any disclaimer, the term of this patent is extended or adjusted under 35 U.S.C. 154(b) by 78 days.

(21) Appl. No.: 18/046,715

(22) Filed: Oct. 14, 2022

(65) Prior Publication Data

US 2024/0123754 A1 Apr. 18, 2024

(51) Int. Cl.
*B42F 7/06* (2006.01)
*B42F 11/04* (2006.01)

(52) U.S. Cl.
CPC ................ *B42F 7/06* (2013.01); *B42F 11/04* (2013.01); *B42P 2241/04* (2013.01); *B42P 2241/18* (2013.01)

(58) Field of Classification Search
CPC ....... A45C 13/001; A45C 13/002; A45C 3/02; B45F 7/04; B45F 7/06; B42P 2241/18; B42P 2241/08; B42F 13/0006; B42F 9/004; B42F 11/04
USPC ........... 206/216, 232, 425; 150/165; 281/45; 362/253
See application file for complete search history.

(56) References Cited

U.S. PATENT DOCUMENTS 5,934,530 A 8/1999 Antczak et al.
6,095,564 A * 8/2000 Wien ..................... A45C 13/02 281/21.1
6,161,979 A * 12/2000 Yamamoto ............. A45C 13/02 281/31
6,264,029 B1 * 7/2001 Motson .................. A45C 11/00 206/472
6,758,335 B2 7/2004 Kajiya
8,770,416 B1 * 7/2014 Guida ..................... B43L 1/008 211/DIG. 1
10,183,628 B2 1/2019 Mea
11,110,736 B1 * 9/2021 Pardee ............... A45C 13/1069
2011/0210022 A1 * 9/2011 Degel ..................... B42F 7/065 206/232

(Continued)

FOREIGN PATENT DOCUMENTS

DE 202012007042 * 9/2012
WO WO-2019016655 A1 * 1/2019 ............ A45C 15/00

OTHER PUBLICATIONS amazon.com, Inc. Nero Manetti—Zippered Vegan Leather Padfolio/Portfolio Pad Holder-Business PU Leather Notepad Folder for Resumes, Interviews, iPad/Tablet, Phone, Legal Pad Notebook Executive Binder for Women, Men. Website. Oct. 4, 2022. https://www.amazon.com/NERO-Portfolio-Holder-Business-Interviews-Executive/dp/B085N2CMP9.

(Continued)

*Primary Examiner* — Rafael A Ortiz
(74) *Attorney, Agent, or Firm* — Fargo Patent & Business Law; Thomas Kading

(57) ABSTRACT

A trifold organizer includes a front page that includes a cover surface and a front page inner surface; a back page that includes a back surface and a back page inner surface; an inner page between the front page and the back page, the inner page comprises a inner page front surface and a back inner page surface; a power supply mounted to the back inner page surface; a light in electrical communication with the power supply; and a charging port in electrical communication with the power supply.

23 Claims, 9 Drawing Sheets

(56) References Cited

U.S. PATENT DOCUMENTS

| | | | | |
|---|---|---|---|---|
| 2012/0111930 A1* | 5/2012 | Maistrellis | B42F 21/06 283/37 |
| 2012/0182740 A1* | 7/2012 | Vermeulen | G06F 1/1647 362/253 |
| 2016/0121642 A1* | 5/2016 | Herbst | B42F 13/26 220/4.23 |
| 2016/0188046 A1* | 6/2016 | Inaba | B42F 13/0006 345/174 |
| 2017/0135456 A1* | 5/2017 | Schartle | A45F 3/02 |
| 2017/0155264 A1* | 6/2017 | Owen | B42F 7/06 |
| 2020/0009897 A1* | 1/2020 | Mehringer | A45C 3/02 |
| 2020/0079135 A1* | 3/2020 | Garcia | B42D 1/06 |

OTHER PUBLICATIONS amazon.com, Inc. Cutter & Buck Classic Tri-fold Padfolio. Website. Oct. 4, 2022. https://www.amazon.com/Cutter-Buck-Classic-Tri-fold-Padfolio/dp/B004FF7ICO.
Ebay Inc. Tri-fold gadget organizer, chargers, cords, gadget storage, elastic straps, NWT. Website Oct. 4, 2022. https://www.ebay.com/itm/175359504070?chn=ps&mkevt=1&mkcid=28.

* cited by examiner

TRIFOLD ORGANIZER

BACKGROUND

The present disclosure relates to an organizer, and more specifically to a trifold organizer which includes a variety of holders which secure various items including a power supply.

People today are often traveling for work or pleasure and are away from their office more frequently. As a result, they often find themselves carrying more and more personal and organizational items, such as business cards, credit cards, notebooks, writing implements, etc. A common way to carry such items is by way of an organizer or portfolio.

SUMMARY

A trifold organizer according to one disclosed non-limiting embodiment of the present disclosure includes a front page that includes a cover surface and a front page inner surface; a back page that includes a back surface and a back page inner surface; an inner page between the front page and the back page, the inner page comprises a inner page front surface and a back inner page surface; a power supply mounted to the back inner page surface; a light in electrical communication with the power supply; and a charging port in electrical communication with the power supply.

A further embodiment of any of the foregoing embodiments of the present disclosure includes a first zipper between the front page and the inner page.

A further embodiment of any of the foregoing embodiments of the present disclosure includes a second zipper between the back page and the inner page.

A further embodiment of any of the foregoing embodiments of the present disclosure includes a first hoop attached to the front page and a second hoop attached to the back page.

A further embodiment of any of the foregoing embodiments of the present disclosure includes a strap attached between the first hoop and the second hoop.

A further embodiment of any of the foregoing embodiments of the present disclosure includes a magnetic flap that extends from the back page, the magnetic flap foldable at least partially onto the front page and magnetically attachable thereto.

A further embodiment of any of the foregoing embodiments of the present disclosure includes at least one mesh pocket is attached to the back inner page surface.

A further embodiment of any of the foregoing embodiments of the present disclosure includes a multiple of credit card pockets is attached to the back inner page surface.

A further embodiment of any of the foregoing embodiments of the present disclosure includes a pencil loop attached to the back inner page surface.

A further embodiment of any of the foregoing embodiments of the present disclosure includes light projects onto the back inner page surface.

A further embodiment of any of the foregoing embodiments of the present disclosure includes the charging port attached to the back inner page surface.

A further embodiment of any of the foregoing embodiments of the present disclosure includes a USB port.

A further embodiment of any of the foregoing embodiments of the present disclosure includes that a pocket attached to the back inner page surface.

A further embodiment of any of the foregoing embodiments of the present disclosure includes that the front page, the back page and the inner page comprise an RFID mesh.

A further embodiment of any of the foregoing embodiments of the present disclosure includes, wherein the power supply comprises a switch for th light and a display to display the power supply power remaining.

A trifold organizer according to one disclosed non-limiting embodiment of the present disclosure includes a front page that includes a cover surface and a front page inner surface; a back page that includes a back surface and a back page inner surface; a notebook pocket holder attached to the back page inner surface; an inner page between the front page and the back page, the inner page comprises a inner page front surface and a back inner page surface; a power supply mounted to the back inner page surface; a light in electrical communication with the power supply; a charging port in electrical communication with the power supply; a first zipper between the front page and the inner page; a second zipper between the back page and the inner page; and a magnetic flap that extends from the back surface, the magnetic flap foldable at least partially onto the cover surface and magnetically attachable thereto.

A further embodiment of any of the foregoing embodiments of the present disclosure includes, wherein the charging port comprises a USB.

A further embodiment of any of the foregoing embodiments of the present disclosure includes, wherein the notebook pocket holder is sized to contain an 8.5×11 notebook.

A further embodiment of any of the foregoing embodiments of the present disclosure includes at least one mesh pocket attached to the inner page back surface and a multiple of credit card pockets attached to the back inner page surface.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
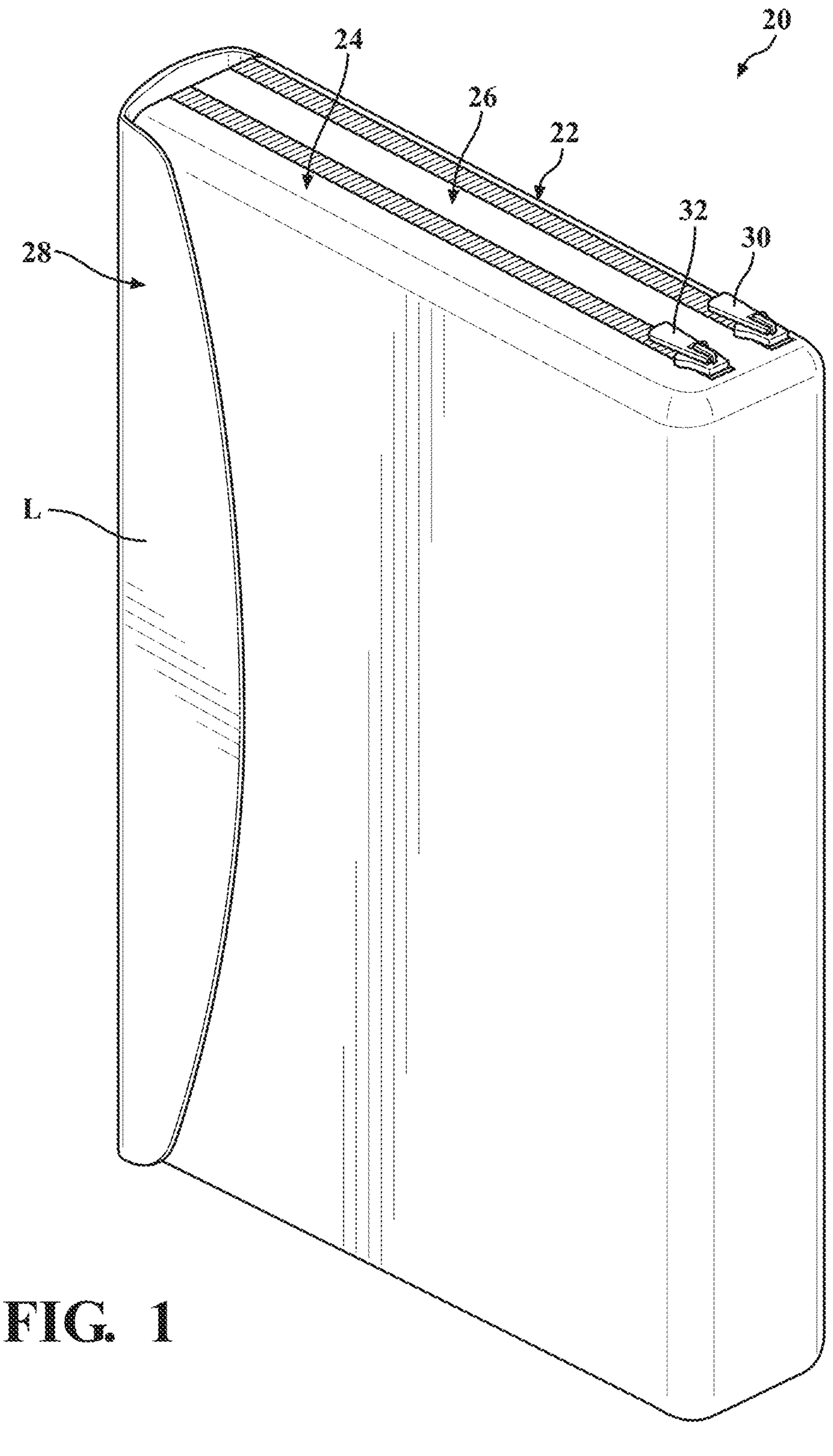
FIG. 1 is a perspective view of a trifold organizer according to one disclosed non-limiting embodiment.

FIG. 1 schematically illustrates a trifold organizer 20 that generally includes a front page 22 (FIG. 2), a back page 24 (FIG. 3), and an inner page 26 therebetween. The front page 22, back page 24, and the inner page 26 may be bound together and a magnetic closure flap 28 may extend from the front page 22 to magnetically attach to the back page 24 so as to secure the pages 22, 24, 26 together. The magnetic closure flap 28 may include a logo, monogram, or other identifier L.

To further secure the trifold organizer 20, a first zipper 30 may be used between the front page 22 and the inner page 26 and a second zipper 32 between the inner page 26 and the back page 24. The magnetic closure 28 may thereby be used to securely close the trifold organizer 20 even when the zippers 30, 32 are not zipped close.

In one embodiment, the trifold organizer 20 may be about 13 inches in length, 9 inches in width, by 2.75 inches deep. In one embodiment, the front page 22 may be about 0.5 inches wide, the back page 24 may be about 1.0 inches wide, and the inner page 26 may be about 1.2 inches wide when measured with respect to the zippers 30, 32. The front storage space F and a back storage space B formed by the page 22, 24, 26 may therefore be specifically tailored to that which is to be contained therein. Of course, other shapes and sizes may benefit from the arrangement disclosed herein.

Figure 4:
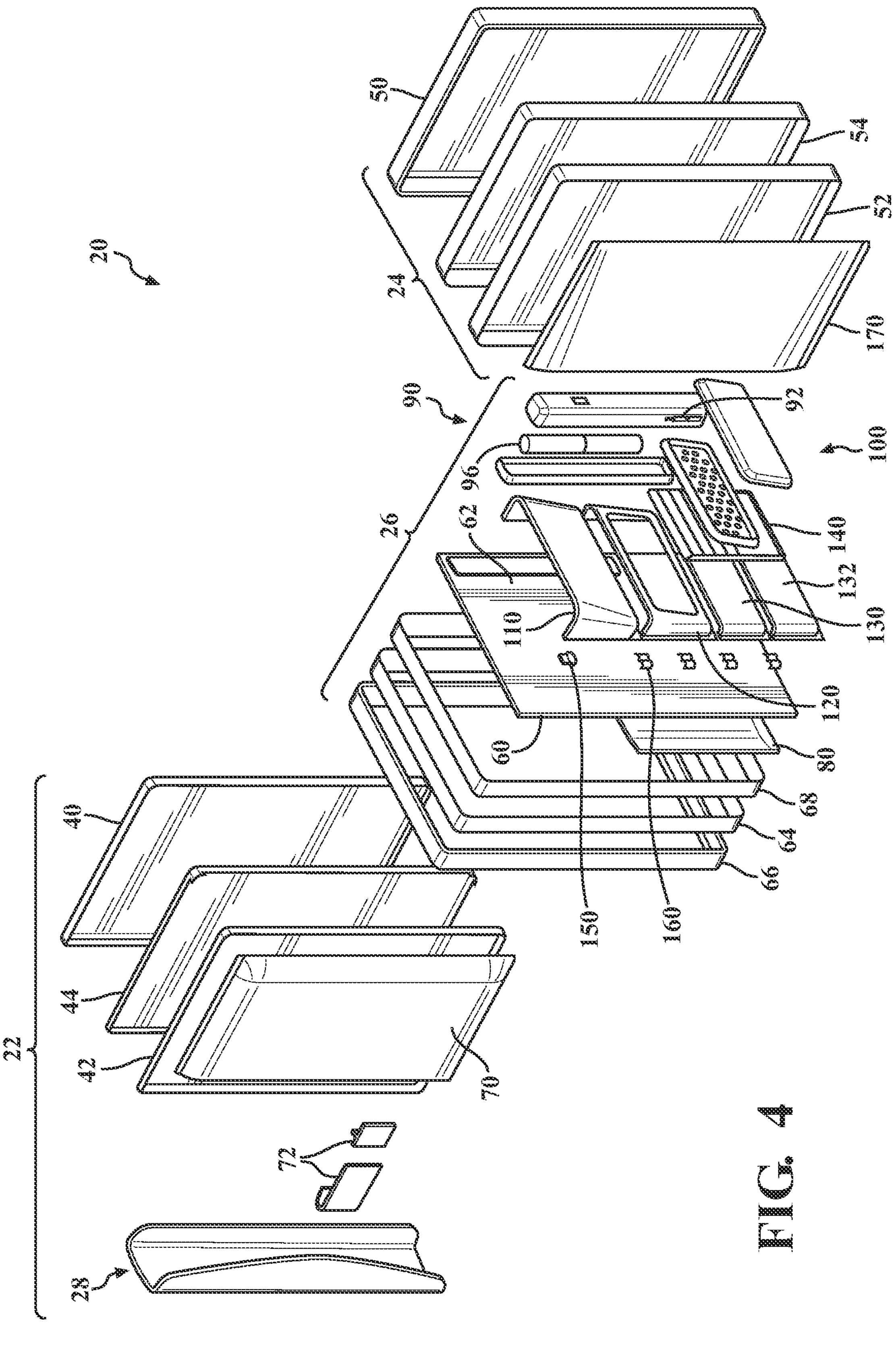
FIG. 4 is an exploded view of the trifold organizer.

With reference to FIG. 4, each page 22, 24, 26 may be formed as a sandwich structure in which outer layers of a durable material such as leather, ballistic nylon, etc., sandwich an inner RFID (Radio Frequency Identification Deterrence) mesh layer therebetween. The RFID mesh layer may be manufactured of a copper and nickel composition to block wireless signals, such as cellular signals, Wi-Fi, Bluetooth, GPS, NFC, etc. The trifold organizer 20 is thereby operable to shield electronic devices, credit cards, etc., that are contained therein.

The front page 22 includes a cover surface 40 and a front page inner surface 42 manufactured of leather material which sandwich an inner front page RFID mesh layer 44 therebetween. The back page 24 includes a back surface 50 and a back page inner surface 52 manufactured of leather material which sandwich an inner back page RFID mesh layer 54 therebetween. The inner page 26 includes a inner page front surface 60, a inner page back surface 62, a front inner cover surface 66, a back inner cover surface 68 manufactured of leather material which sandwich an inner RFID mesh layer 64 therebetween. The inner RFID mesh layer 64 provides an outer RFID envelope to complement the inner front page RFID mesh layer 44 and the inner back page RFID mesh layer 54. The storage spaces formed by the page 22, 24, 26 thereby completely shielded by the RFID mesh. Although a particular structure is disclosed in the illustrated embodiment, other structures to provide other constructions will also benefit herefrom.

Figure 2:
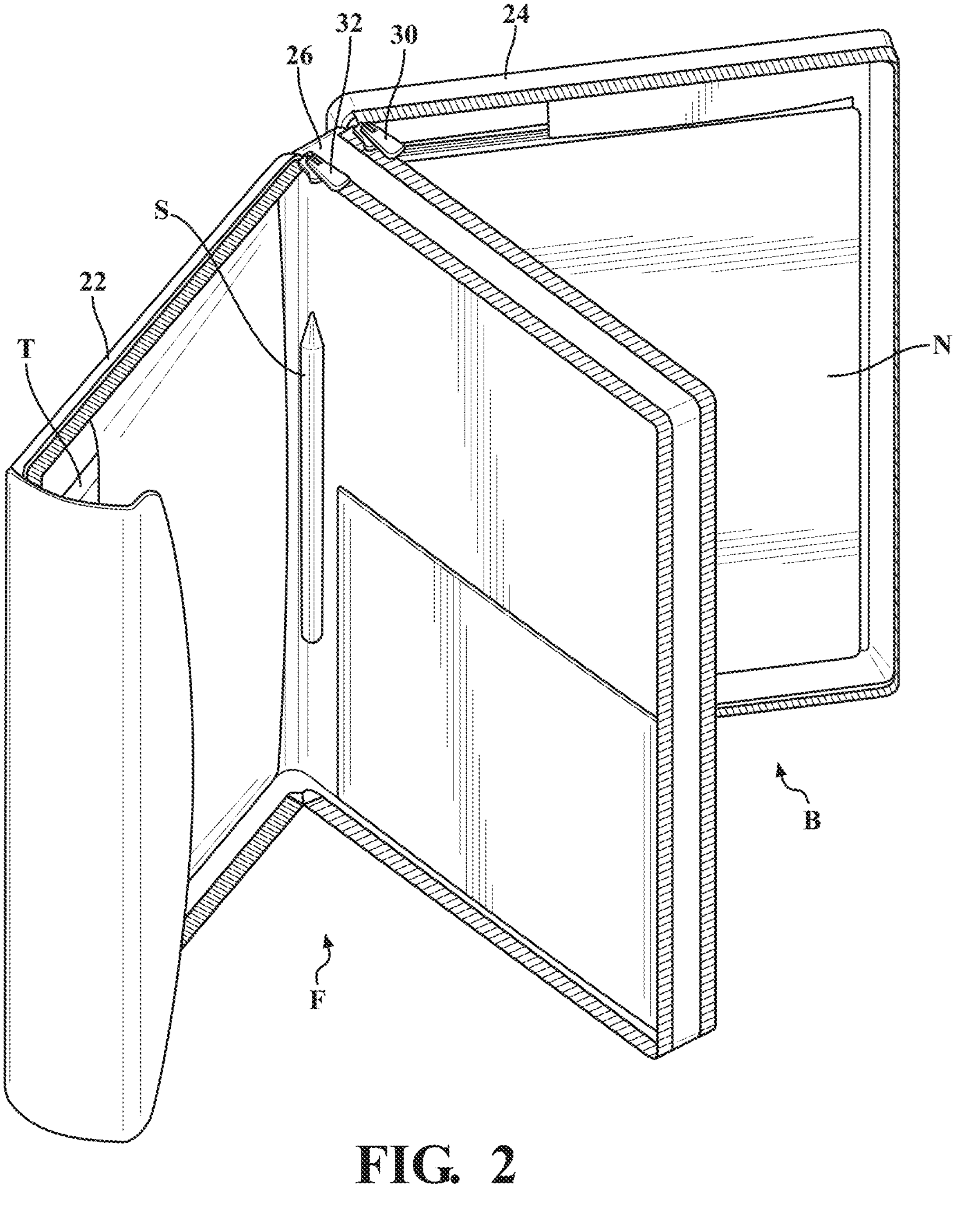
FIG. 2 is a perspective view of a front storage space of the trifold organizer.
Figure 3:
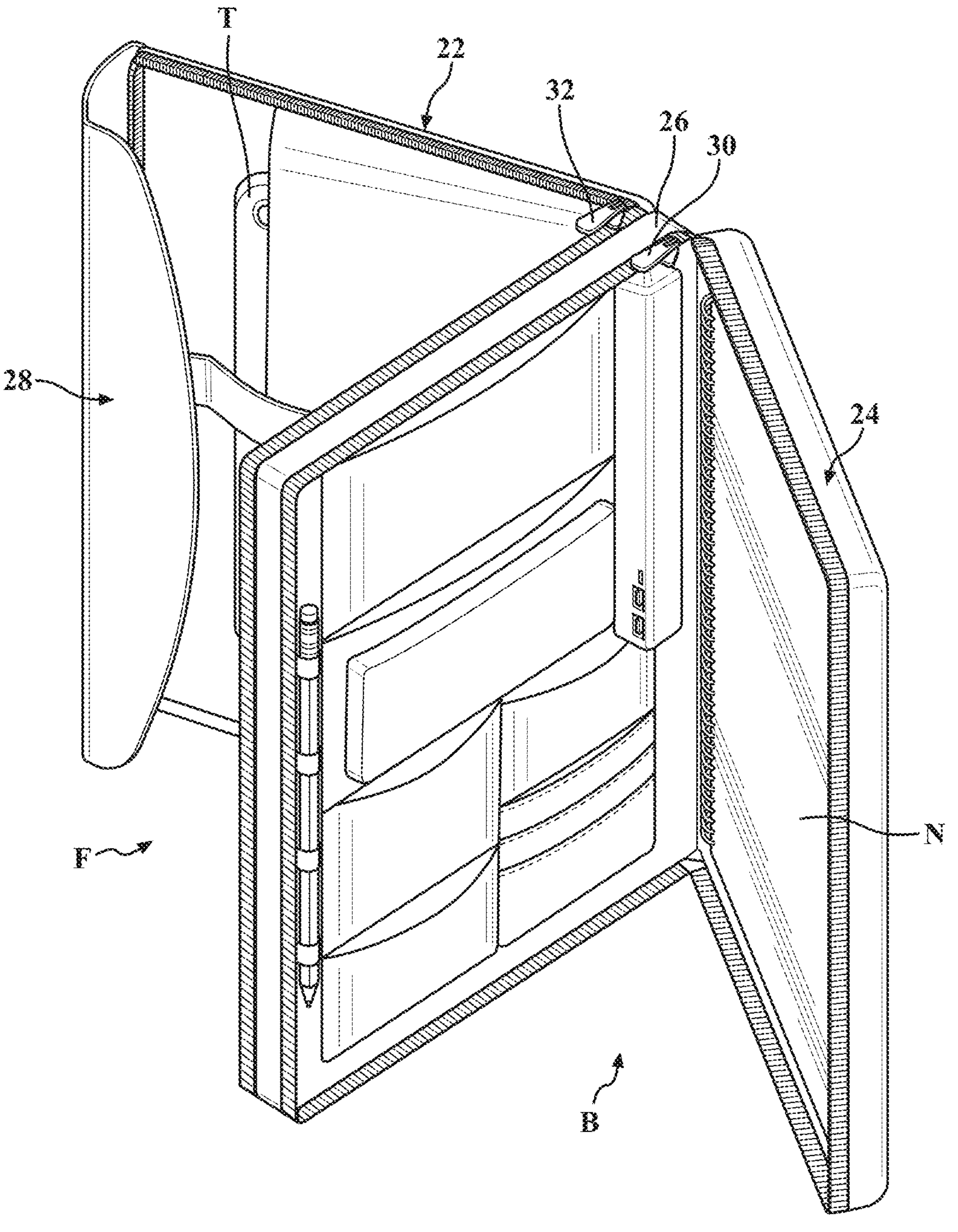
FIG. 3 is a perspective view of a back storage space of the trifold organizer.
Figure 5:
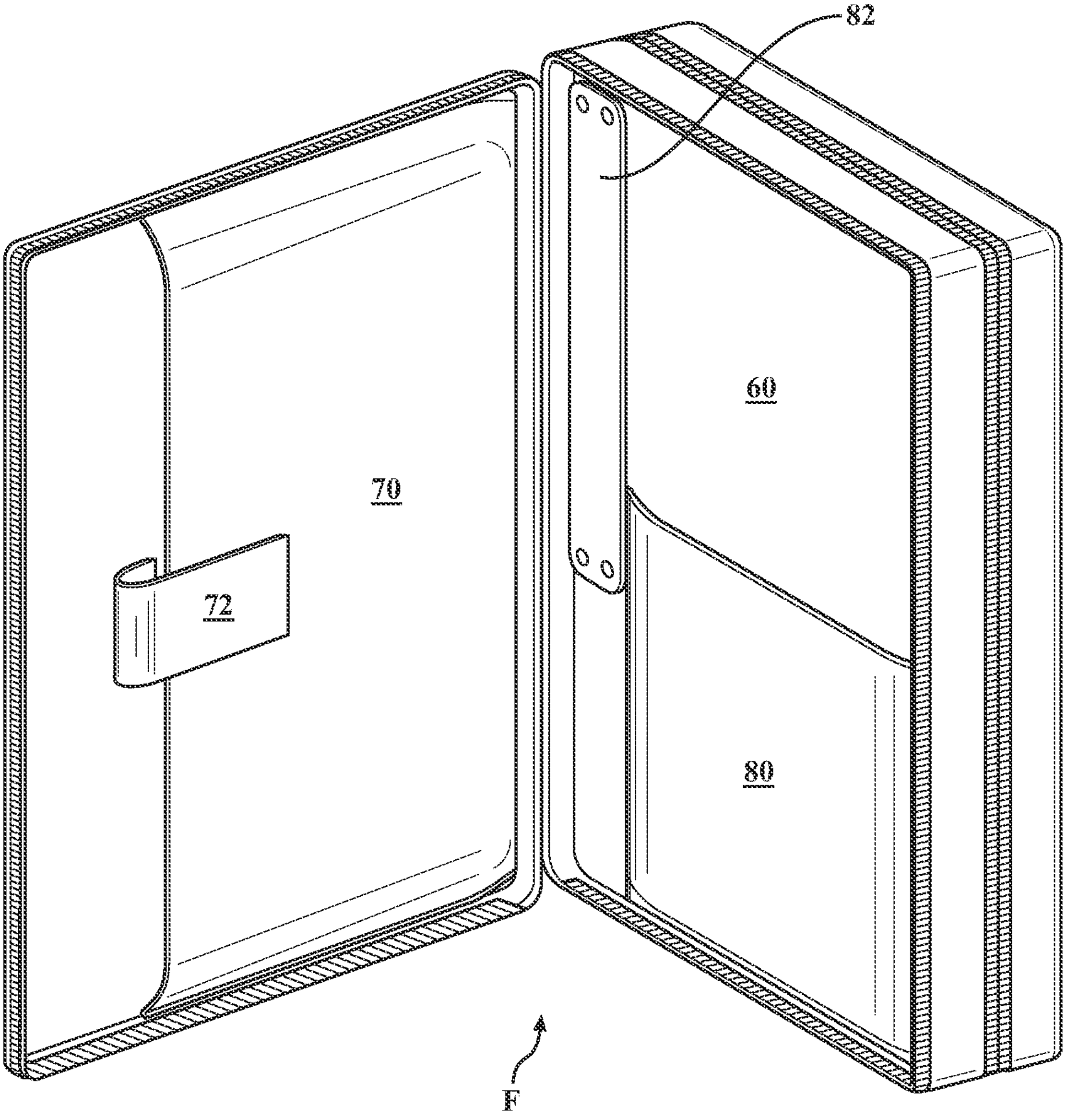
FIG. 5 is a perspective view of the front storage space of the trifold organizer.
Figure 6:
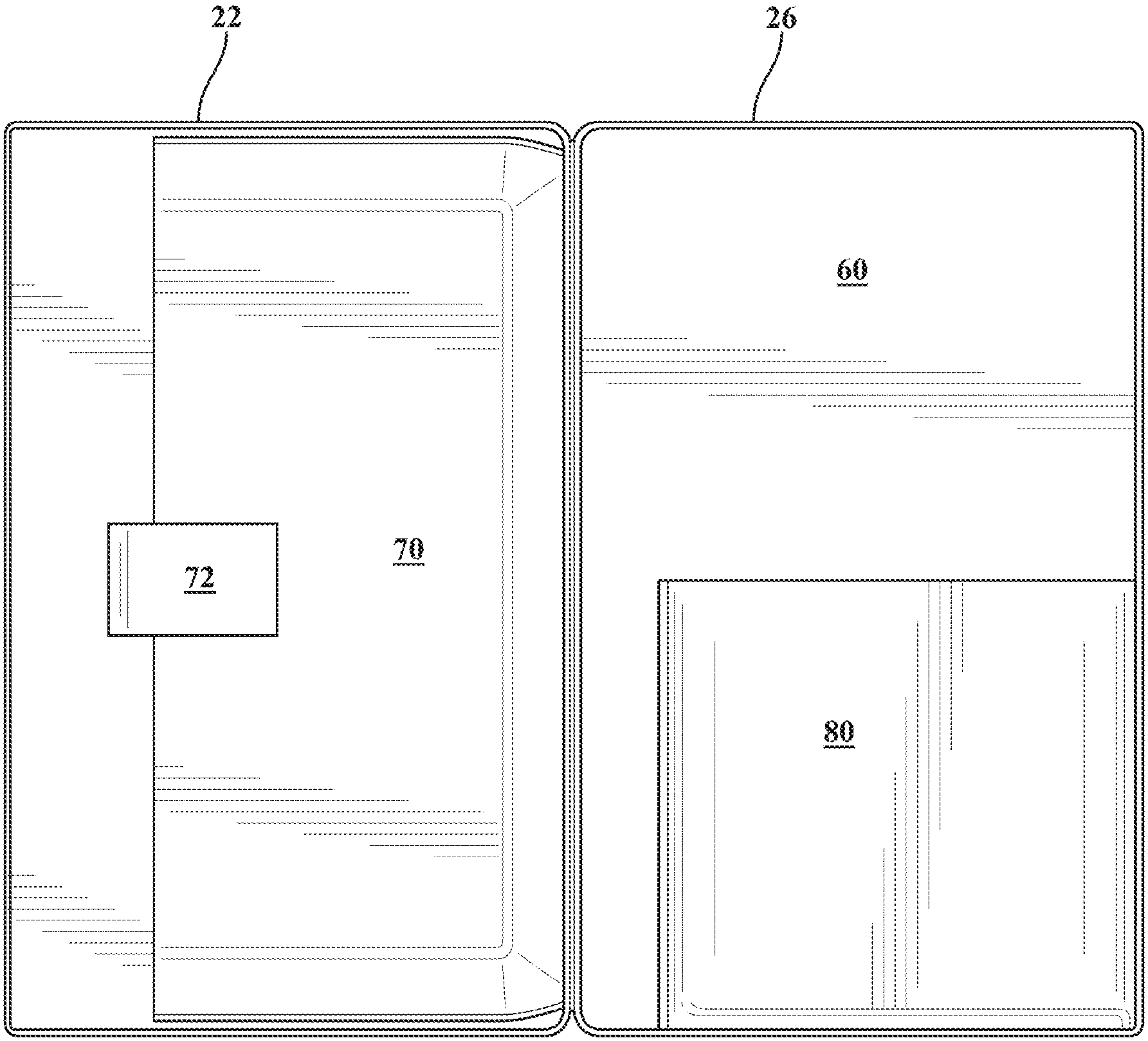
FIG. 6 is a flat view of the front page of the trifold organizer.

The front page inner surface 42 may include a vertically arranged pocket 70 (also shown in FIGS. 5 and 6) to receive, for example, a tablet type device T (FIGS. 2 and 3). In one embodiment, the vertically arranged pocket 70 may extend outward 0.5 inches to facilitate receipt of the tablet type device T. A closure 72 such as an elastic hook and loop closure may be arranged to secure the tablet within the vertically arranged pocket 70.

In one embodiment, the inner page front surface 60 may include a horizontally arranged pocket 80 and a plate 82 to which a stylus S (FIG. 2) may be magnetically attached. In one embodiment, the horizontally arranged pocket 80 may extend outward 0.24 inches. The horizontally arranged pocket 80 may also receive a tablet type device.

In one embodiment, the inner page back surface 62 generally includes a power supply 90, a light 100, an eyeglasses pocket 110, a phone pocket 120, utility pockets 130, 132, a business card pocket 140, a keyholder loop 150 and a pen/pencil retainer 160. Although a particular arrangement is disclosed it should be appreciated that other arrangements may benefit herefrom. The pockets may be formed from leather or as a mesh material.

Figure 7:
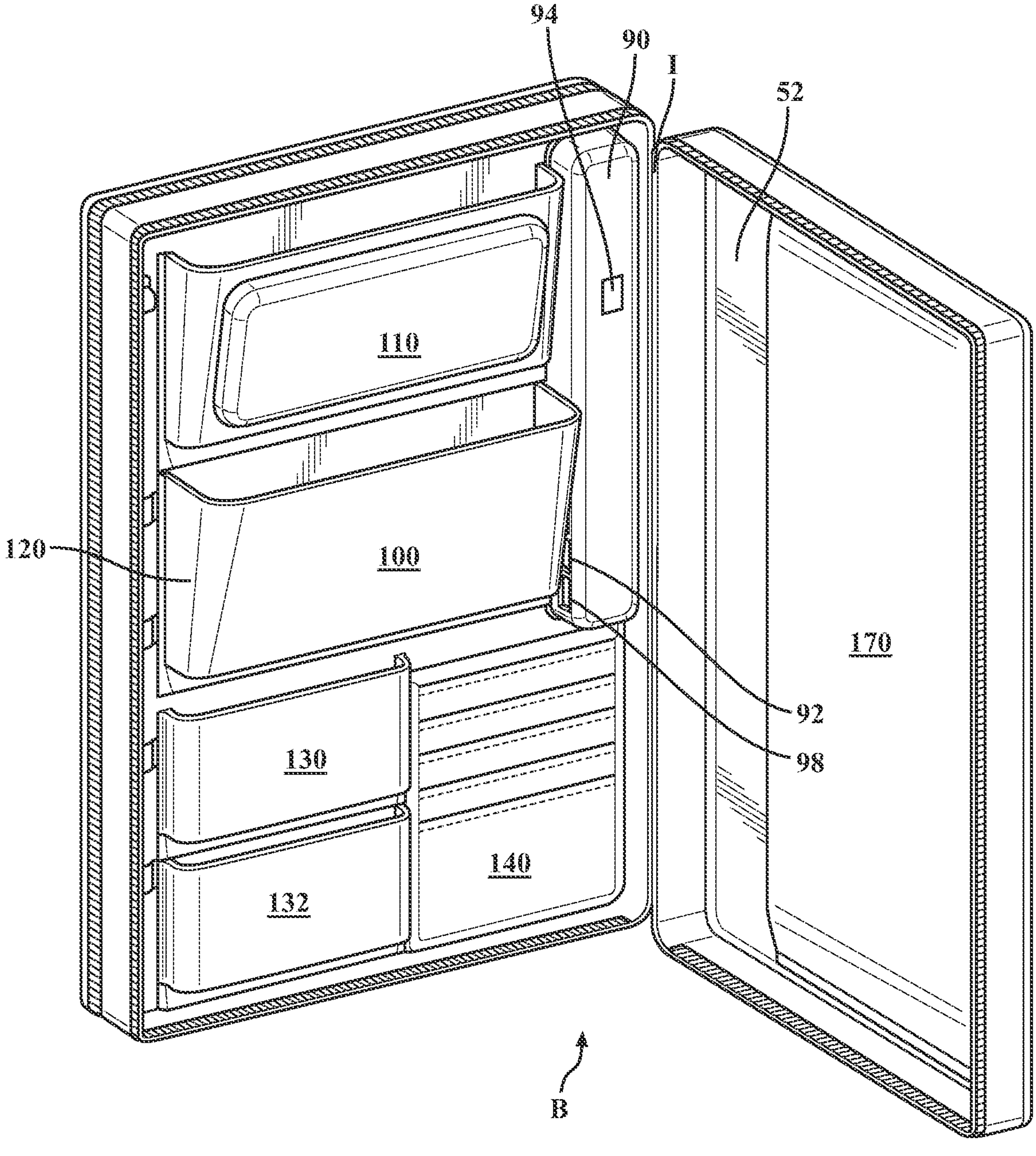
FIG. 7 is a perspective view of the back storage space of the trifold organizer.
Figure 8:
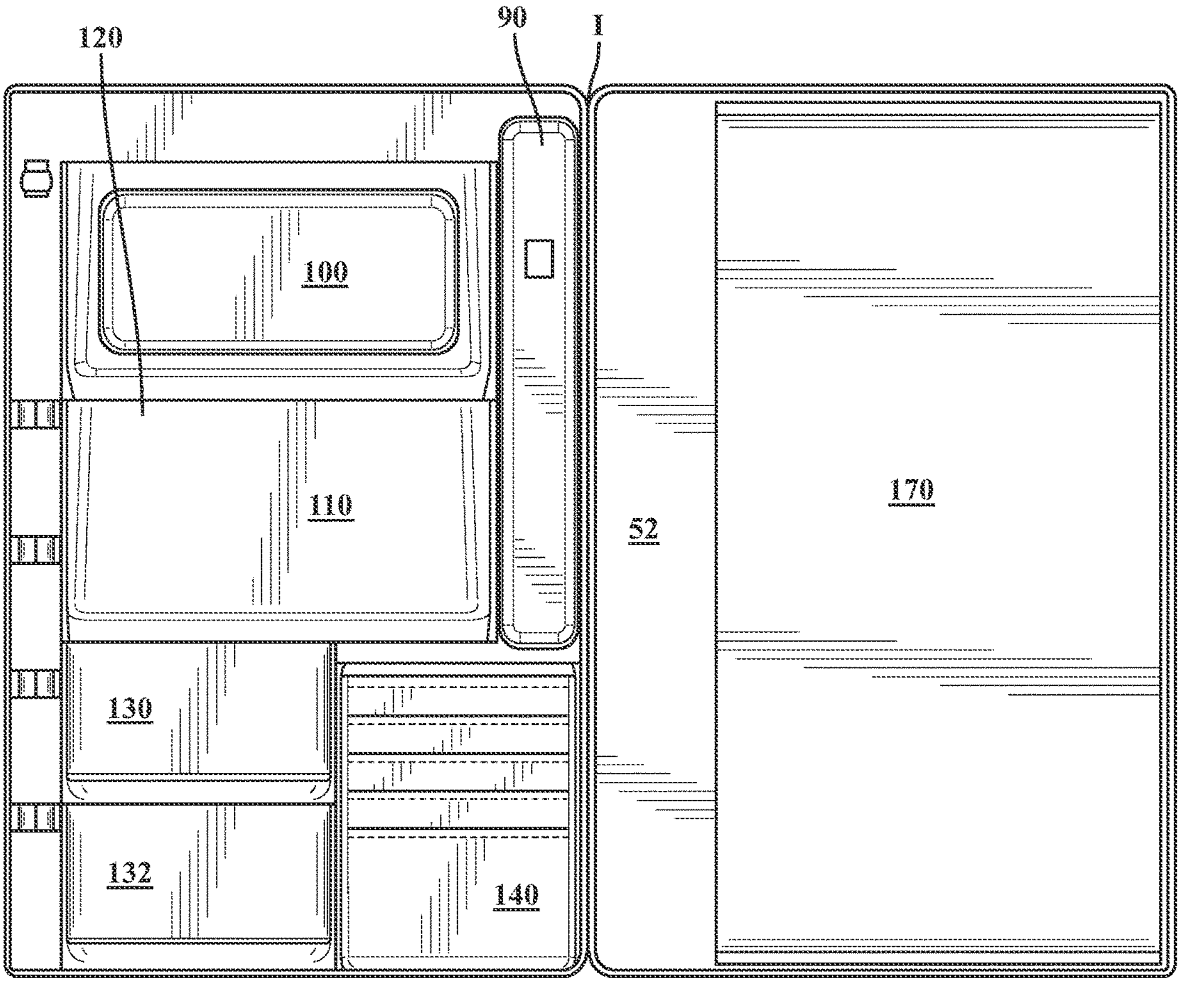
FIG. 8 is a flat view of the back page of the trifold organizer.

The power supply 90 may be arranged vertically which is herein defined as generally parallel and adjacent to an interface I (FIGS. 7 and 8) between the inner page back surface 62 and the back page inner surface 52. The power supply 90 may include one or more ports 92 such as for example, USB, HDMI, three prong socket, wireless charger pad, etc. A display 94 on the power supply 90 may show remaining power percentage, time, voltage, etc., of the storage battery 96 in response to pressing a button 98 or other such control. That is, the power supply 90 includes one or more rechargeable storage battery 96 and a control circuit which provides for operation of the display 94 and the button 98 to facilitate, for example, protection against overcharge, over discharge, excessive current, short circuits, overheating, etc.

The light 100 receives power from the power supply 90 and may be arranged horizontal or transverse to the power supply 90. In this embodiment, the light 100 is mounted on the phone pocket 120. The light 100 may be an ultraviolet light to provide for sanitization and/or white light for writing in a low light environment.

In one embodiment, the eyeglasses pocket 110 may be about 6.7 inches in length, 3.5 inches in width, by 1.5 inches deep and the phone pocket 120 may be about 6.7 inches in length, 3.5 inches in width, by 1.0 inches deep. The two utility pockets 130, 132 and the business card pocket 140 may be located adjacent to the phone pocket 120. In one embodiment, each utility pocket 130, 132 may be about 4.2 inches in length, 2.4 inches in width, by 0.5 inches deep. The business card pocket 140 may include one or more slots (four shown) for standard sized business cards.

The back page inner surface 52 may include a vertically arranged pocket 170 to receive, for example, an 8.5 inch by 11 inch spiral notebook N (FIGS. 2 and 3). In one embodiment, the vertically arranged pocket 170 may be about 6.8 inches by 12.6 inches.

Figure 9:
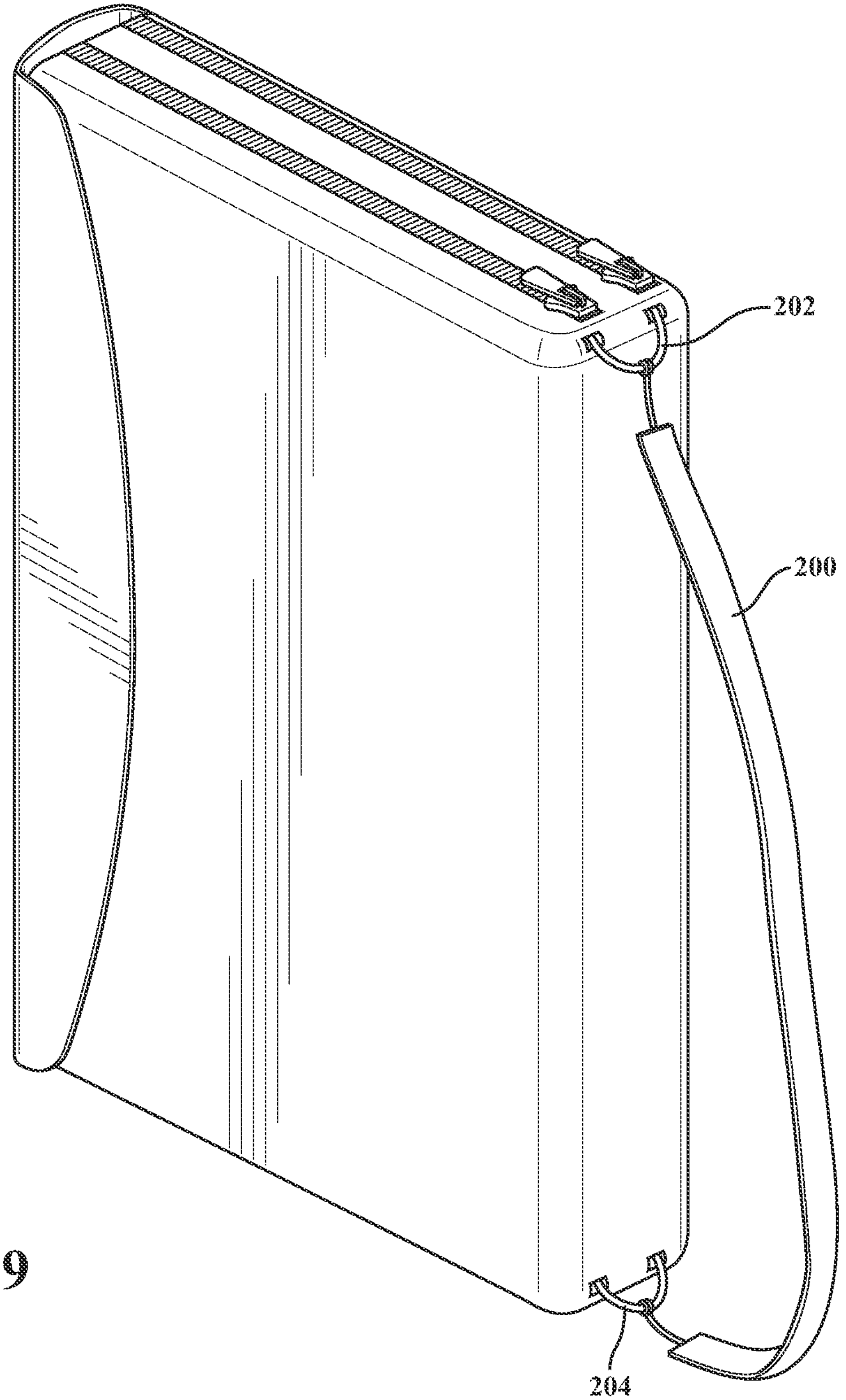
FIG. 9 is a perspective view of a trifold organizer according to another disclosed non-limiting embodiment.

With reference to FIG. 9, in another embodiment, a strap 200 may be removably attached between a respective hoop 202, 204 to facilitate carriage of the trifold organizer 20 in a purse or luggage type manner.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A trifold organizer comprising:

a front page that comprises a cover surface and a front page inner surface;

a back page that comprises a back surface and a back page inner surface;

an inner page between the front page and the back page, the inner page comprises an inner page front surface and a back inner page surface;

a power supply mounted to the back inner page surface;

a light in electrical communication with the power supply; and a charging port in electrical communication with the power supply.

2. The trifold organizer according to claim 1, further comprising a first zipper between the front page and the inner page.

3. The trifold organizer according to claim 2, further comprising a second zipper between the back page and the inner page.

4. The trifold organizer according to claim 1, further comprising a first hoop attached to the front page and a second hoop attached to the back page.

5. The trifold organizer according to claim 4, further comprising a strap attached between the first hoop and the second hoop.

6. The trifold organizer according to claim 1, further comprising a magnetic flap that extends from the back page, the magnetic flap foldable at least partially onto the front page and magnetically attachable thereto.

7. The trifold organizer according to claim 1, further comprising at least one mesh pocket is attached to the back inner page surface.

8. The trifold organizer according to claim 1, further comprising a multiple of credit card pockets is attached to the back inner page surface.

9. The trifold organizer according to claim 1, further comprising a pencil loop attached to the back inner page surface.

10. The trifold organizer according to claim 1, wherein the light is mounted to a pocket.

11. The trifold organizer according to claim 1, wherein the charging port is attached to the power supply.

12. The trifold organizer according to claim 11, wherein the charging port comprises a USB port.

13. The trifold organizer according to claim 1, further comprising a pocket attached to the back inner page surface.

14. The trifold organizer according to claim 1, wherein the front page, the back page and the inner page comprise an RFID mesh.

15. The trifold organizer according to claim 14, wherein the power supply comprises a switch for the light and a display to display the power supply power remaining.

16. A trifold organizer comprising:

a front page that comprises a cover surface and a front page inner surface;

a back page that comprises a back surface and a back page inner surface;

a notebook pocket holder attached to the back page inner surface;

an inner page between the front page and the back page, the inner page comprises an inner page front surface and a back inner page surface;

a power supply mounted to the back inner page surface;

a light in electrical communication with the power supply;

a charging port in electrical communication with the power supply;

a first zipper between the front page and the inner page;

a second zipper between the back page and the inner page; and a magnetic flap that extends from the back surface, the magnetic flap foldable at least partially onto the cover surface and magnetically attachable thereto.

17. The trifold organizer according to claim 16, wherein the charging port comprises a USB port.

18. The trifold organizer according to claim 17, wherein the notebook pocket holder is sized to receive an 8.5×11 inch notebook.

19. The trifold organizer according to claim 18, further comprising at least one mesh pocket attached to the inner page back surface and a multiple of credit card pockets attached to the back inner page surface.

20. The trifold organizer according to claim 1, wherein the light is an ultraviolet light in electrical communication with the power supply to provide for sanitization.

21. The trifold organizer according to claim 16, wherein the light is an ultraviolet light in electrical communication with the power supply to provide for sanitization.

22. The trifold organizer according to claim 21, wherein the light is mounted to the phone pocket.

23. A trifold organizer comprising:

a front page that comprises a cover surface and a front page inner surface;

a back page that comprises a back surface and a back page inner surface;

a notebook pocket holder attached to the back page inner surface, the notebook pocket holder sized to receive an 8.5×11 inch notebook on the back page inner surface;

an inner page between the front page and the back page, the inner page comprises an inner page front surface and a back inner page surface;

a power supply mounted to the back inner page surface;

an ultraviolet light in electrical communication with the power supply to provide for sanitization;

a phone pocket mounted to the back inner page surface, the ultraviolet light mounted to the phone pocket;

a charging port in electrical communication with the power supply;

a first zipper between the front page and the inner page;

a second zipper between the back page and the inner page; and a magnetic flap that extends from the back surface, the magnetic flap foldable at least partially onto the cover surface and magnetically attachable thereto.

* * * * *